United States Patent [19]

Hood et al.

[11] Patent Number: 4,957,274
[45] Date of Patent: Sep. 18, 1990

[54] POSITION SENSOR FOR A ROTARY VALVE

[75] Inventors: James A. Hood, Concord; Paul A. Kirkpatrick, Charlotte, both of N.C.

[73] Assignee: Ingersoll-Rand Company, Woodcliff Lake, N.J.

[21] Appl. No.: 457,131

[22] Filed: Dec. 26, 1989

[51] Int. Cl.5 ............................................. F16K 31/04
[52] U.S. Cl. ........................... 251/129.12; 251/129.11; 251/129.04; 251/129.05
[58] Field of Search ................ 251/129.11, 129.12, 251/129.2, 129.04, 129.13, 129.05

[56] References Cited

U.S. PATENT DOCUMENTS

| | | | |
|---|---|---|---|
| 3,839,662 | 10/1974 | N'Guyen Van | 251/129.12 X |
| 3,870,274 | 3/1975 | Broe | 251/129.12 |
| 4,205,783 | 6/1980 | Dietsche | 251/129.11 X |
| 4,364,111 | 12/1982 | Jocz | 251/129.11 X |
| 4,556,169 | 12/1985 | Zervos | 251/129.11 X |
| 4,690,168 | 9/1987 | Kihm | 251/129.11 X |
| 4,850,319 | 7/1989 | Imoehl | 251/129.11 X |
| 4,875,623 | 10/1989 | Garris | 251/129.13 X |

Primary Examiner—Arnold Rosenthal
Attorney, Agent, or Firm—Glenn B. Foster

[57] ABSTRACT

A position of a rotary valve having limited motion between an open and a closed position is determined by a limit sensor. A stepper motor supplies power to open and close the rotary valve. A coupling transmits any stepper motor motion to the rotary valve. A sensor actuator is affixed to the coupling. A limit sensor determines the position of the rotary valve by sensing the position of the sensor actuator, wherein there is no contact between the sensor actuator and the limit switch when the position of the rotary valve is being determined.

26 Claims, 3 Drawing Sheets

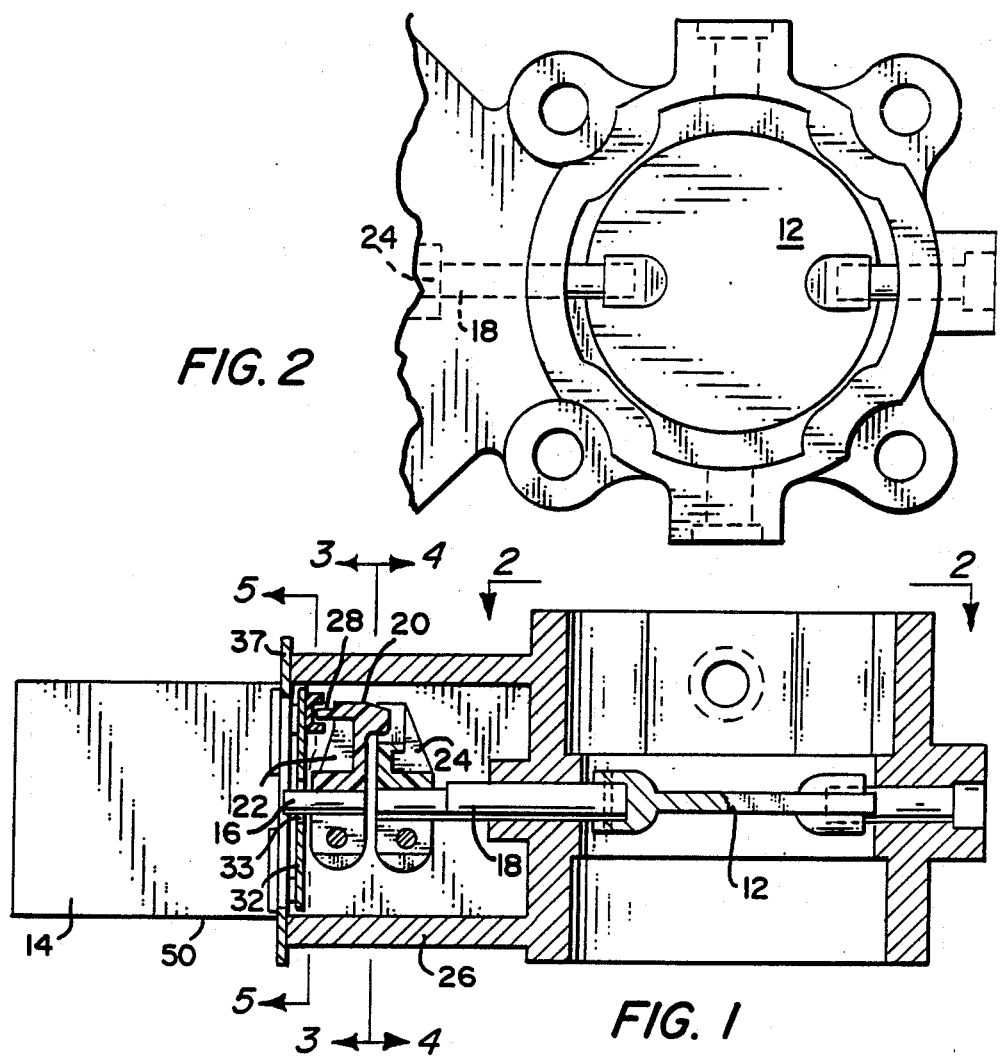

POSITION SENSOR FOR A ROTARY VALVE

BACKGROUND OF THE INVENTION

This invention relates generally to a rotary valve position sensor, and more particularly to an electrical or electronic sensor which indicates the position of a valve.

Typical control systems for capacity control valves on rotary screw compressors consists of pneumatic, hydraulic, and electrical components. These systems are often complicated, expensive and require frequent service. Recently, stepper motors have been used for this purpose. Although the use of stepper motors reduces the number of moving parts and associated wear problems, stepper motors require feedback of inlet valve position. Furthermore, the electronics required for this feedback must be protected from damage or contamination in industrial environments.

Examples of electronic control for inlet valves include encoders, which have been placed on the output end of the stepper motors to sense the position of the valve. The encoders determined the position of the valve by determining the number of impulses input to the stepper motor to cause angular displacement. There was no assurance that the position of the valve was accurately reflected by the position of the stepper motor.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a system to determine a position of a rotary valve. A stepper motor means supplies power to open and close the rotary valve. A coupling means transmits stepper motor means power to the rotary valve. A switch actuator is affixed to the coupling means. A limit sensor means determines the position of the rotary valve by sensing the position of the switch actuator, wherein there is no contact between the sensor actuator and the limit switch when the position of the rotary valve is being determined.

The forgoing and other aspects will become apparent from the following detailed description of the invention when considered in conjunction with the accompanying drawing. It is to be expressly understood, however, that the drawing figures are not intended as a definition of the invention, but are for the purpose of illustration only.

BRIEF DESCRIPTION OF THE DRAWING

In the drawing:

FIG. 1 is a side cross sectional view illustrating an embodiment of the valve-stepper motor assembly of the instant invention;

FIG. 2 is a top view illustrating the valve-stopper motor assembly of FIG. 1 as taken along section lines 2—2 of FIG. 1;

DETAILED DESCRIPTION

Figure 3:
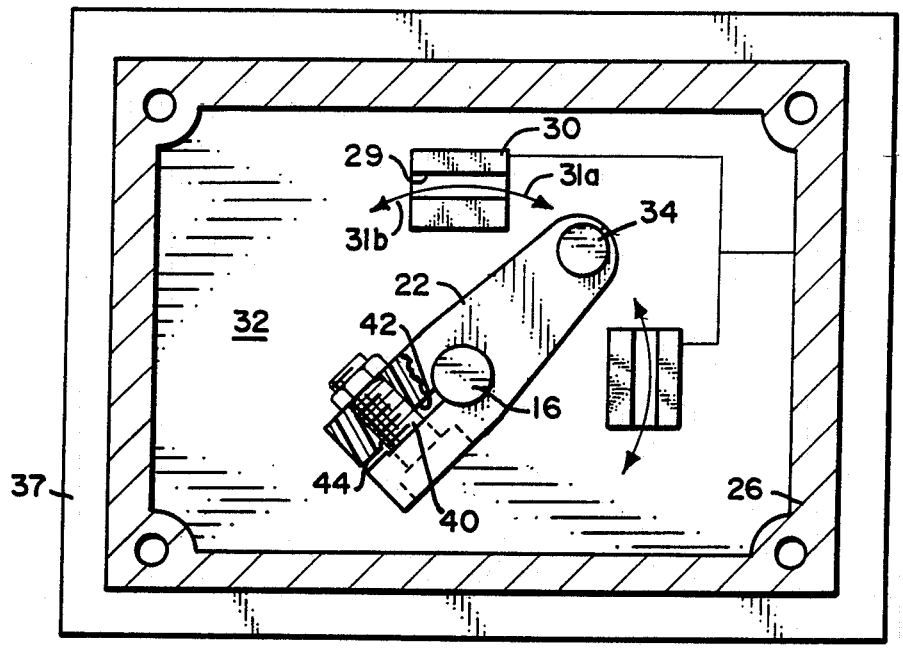
FIG. 3 is a sectional view taken along section lines 3—3 of FIG. 1.
Figure 4:
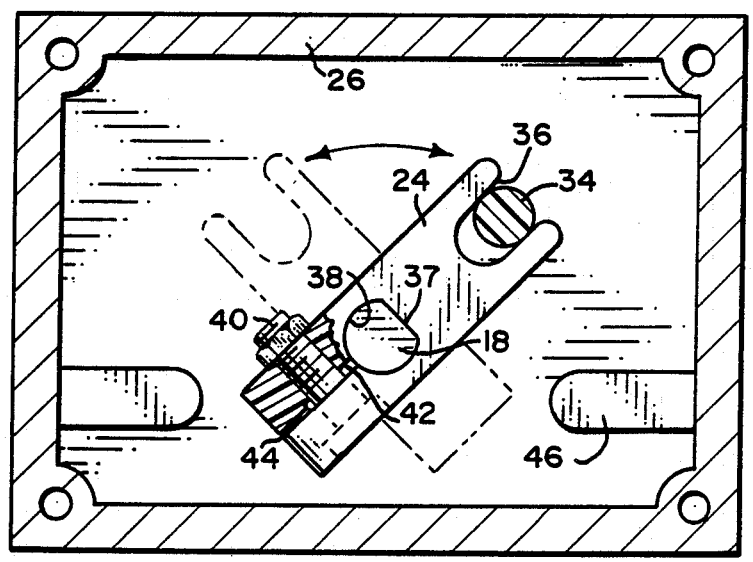
FIG. 4 is a sectional view taken along section lines 4—4 of FIG. 1.
Figure 5:
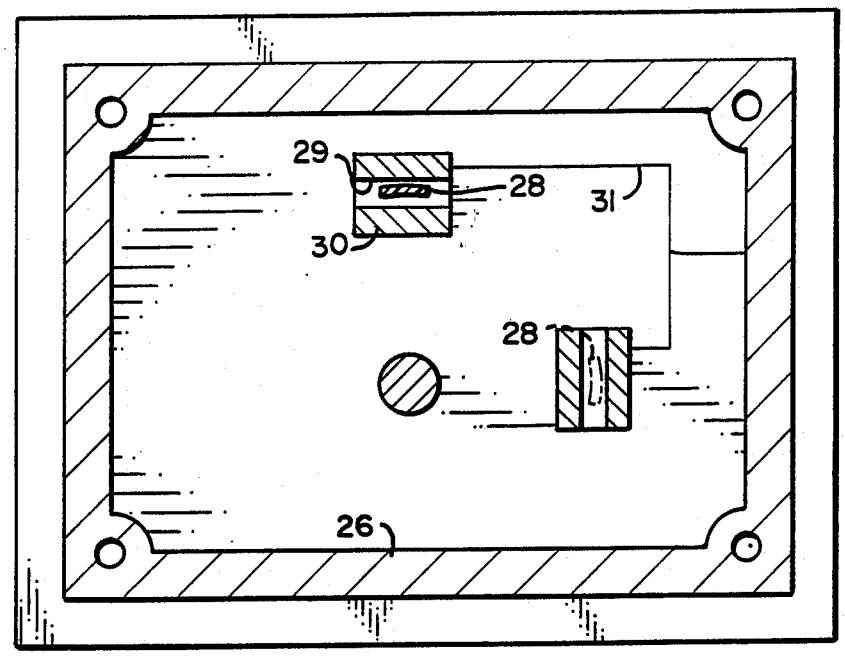
FIG. 5 is a sectional view taken along section lines 5—5 of FIG. 1.
Figure 6:
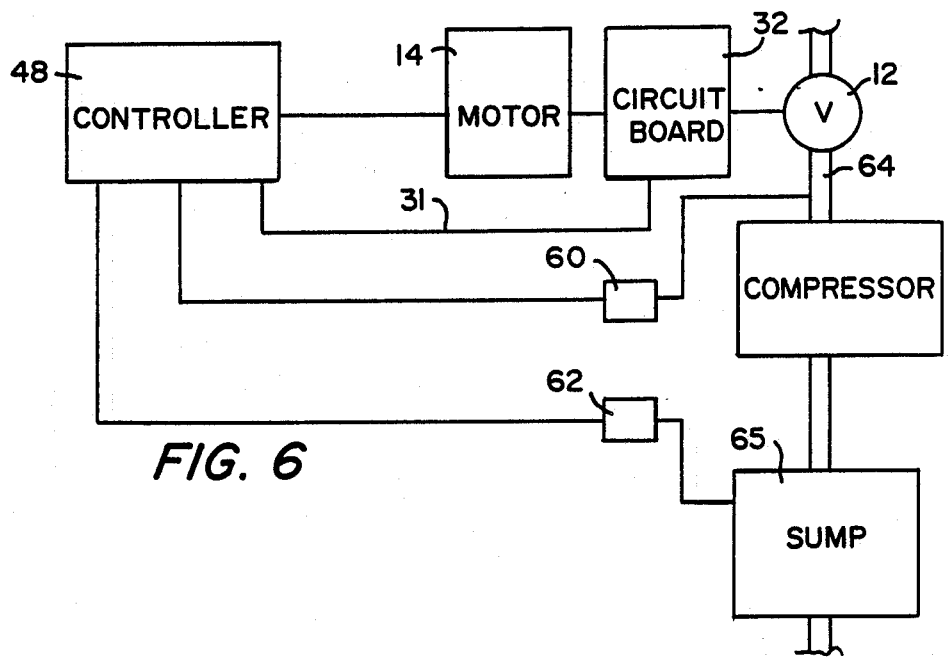
FIG. 6 is one embodiment of the electrical connections between the controller, stepper motor, printed circuit board, compressor and inlet valve of the instant invention.

An inlet valve-stepper motor assembly 10 includes a rotary valve 12 which is powered by a stepper motor 14. The valve 12 is typically an inlet valve of an air compressor, even though it could be applied any rotary valve. A motor shaft 16 carries the rotary output of the stepper motor 14, while rotation of a valve shaft 18 controls the position of the rotary inlet valve 12. A coupler 20 (including a male coupling portion 22 and a female coupling portion 24) transmits any rotary output motion of the motor shaft 16 to the valve shaft 18.

An enclosure 26 shields the coupling and the shafts 16 and 18 from the outside. A switch actuator 28 is formed on the male coupling portion 22 while a limit sensor 30 is mounted to sense the switch actuator 28 when the valve is at a desired position, such as fully open or closed. The sensor therefore determines the position of the valve directly through the position of the coupler 20, instead of sensing the stepper motor 14 position.

It is preferable that the limit sensor 30 be of non-contracting type (such as a light beam, hall effect, or magnetic) such that wear will be eliminated. However, contact limit sensors 30 such as a contact switch may also be used. The cross section of the switch actuator 28 may also be formed in an arc to conform to the arc of travel of the actuator 28 within the sensor 30.

Where non-contacting sensors are being used, the sensor actuator 28 can freely pass through the limit sensor from a first side 31a of the limit sensor 30 to a second side 31b (opposite the first side 31a). In this manner, more limit sensors 30 may be used to more accurately determine the location of the sensor actuator 28, and more precisely control the operation of the stepper motor.

The limit sensors 30 are mounted on a printed circuit board 32. An aperture 33 is formed in the board 32 to accommodate the motor shaft 16. Electrical conductors 31 are arranged on the printed circuit board 32 to power the limit sensors 30.

The circuit board 32 is firmly mounted with respect to the motor shaft 16 to provide a reliable mounting for the limit sensors 30. A mounting plate 37 is affixed to the stepper motor 14, and the circuit board 32 is attached to the mounting plate.

The male coupling portion 22 and the female coupling portion 24 permit transmission of motion between the two coupling portions even when the two shafts 16 and 18 are not perfectly aligned. The male coupling portion 22 has a projection 34 which interfits in a groove 36 longitudinally formed within the female coupling portion 24.

This type of assembly permits "blind assembly". That is the stepper motor 14, mounting plate 30, circuit board 32, motor shaft 16, and coupling portion 22 may be constructed as an assembly 50. This entire assembly may be assembled, disassembled, removed and replaced as desired. When the assembly is connected to the valve, it is vital to ensure that the projection 34 of the male coupling portion 22 is aligned with the slot of the female coupling portion 24.

As the male coupling portion 22 is rotated by the stepper motor 14, then the projection 34 will exert force against the side of the groove 36 (while sliding in the groove) and thereby cause the female coupling portion to rotate.

The coupling portions 22, 24 are each fixedly attached to the shaft 16 or 18. Each coupling portion contains an aperture 38 so the coupling can mount to the shaft 16, 18. The interior of the aperture of each coupling portion preferably contains a keyed 37 or knurled surface to prevent rotation between the coupling portion and the shaft.

The coupling portions 22, 24 are tensioned onto the shafts by fasteners 40. A slot 42 is formed in the coupling portions such that pressure exerted on the fastener may be transmitted to the junction of the aperture 38 and the shaft 16, 18. A shoulder 44 is formed on the end of each slot 42 to ensure that the fastener 40 compressive force acts to tension the coupling portion to the shaft instead of compressing the slot 42 together. A mechanical stop 46 may be included to prevent over-rotation of the coupler 20, and therefore the valve 12. In this manner, the valve is prevented from rotating to such a position such as the sensors may give unreliable readings.

The operation of the inlet valve-stepper motor assembly 10 is controlled by a controller 48. The controller receives electrical input from circuit board 32 which reads the position of coupler 20. The controller 48 also receives electrical input from transducers 60, 62 which read compressor inlet 64 and compressor sump 64 pressures respectively. This monitoring of the pressures by the controller 48 is vital since minor valve 12 displacement can greatly affect the valve operation and the associated compressor operation.

It is preferable that the coupling 20 be constructed from a plastic material. This permits simple part fabrication by molding without expensive machining. The plastic material also provides self-lubrication between the projection 34 and the groove 36. The plastic material also damps the connection between the male and the female coupling portions 22, 24.

While this invention has been illustrated and described in accordance with a preferred embodiment, it is recognized that variations and changes may be made therein without departing from the invention as set forth in the claims.

What is claimed is:

1. A system to determine a position of a rotary valve comprising:
    a stepper motor means for supplying power to open and close the rotary valve;
    a coupling means for transmitting stepper motor power to the rotary valve;
    a sensor actuator affixed to the coupling means; and
    at least one limit sensor means for determining the position of the rotary valve by sensing the position of the sensor actuator, wherein there is no contact between the sensor actuator and the limit sensor when the position of the rotary valve is being determined.

2. The system as defined in claim 1 wherein the limit sensor comprises a light beam sensor.

3. The system as defined in claim 1 wherein the limit sensor comprises an inductive sensor.

4. The system defined in claim 1 wherein the limit sensor comprises a magnetic sensor.

5. The system defined in claim 1 wherein the limit sensor comprises a hall effect sensor.

6. The system defined in claim 1 further comprising:
    a positioning support means for positioning the limit sensor in position with respect to the coupling means.

7. The system as defined in claim 1 further comprising:
    a mechanical stop means for limiting over-rotation of the coupling means.

8. The system as defined in claim 1 wherein the switch actuator has a concave configuration.

9. The system as defined in claim 1 further comprising:
    a controller means for controlling the position of the rotary valve.

10. The system as defined in claim 1 wherein the coupling means is formed of plastic.

11. The system as defined in claim 1, wherein the sensor actuator may pass from a first side of the limit sensor means, through the limit sensor means, to a second opposite side of the limit sensor means.

12. A system to determine a position for a rotary valve comprising:
    a stepper motor means for supplying power to open and close the valve;
    a coupling means, comprising a male coupling portion and a female coupling portion, for transmitting stepper motor power to the valve;
    a sensor actuator which is affixed to the coupling means; and
    at least one limit sensor means for actuation by the sensor actuator.

13. The system as defined in claim 12 wherein the male coupling portion includes a ball member, the ball member interacts with a slot formed in the female coupling portion.

14. The system as defined in claim 12 further comprising:
    a motor shaft which is attached to one of the coupling portions.

15. The system as defined in claim 14 further comprising:
    a valve shaft which is attached to the other of the coupling portions.

16. The system as defined in claim 15 wherein at least one of the shafts is attached to the coupling portion by a keyed surface.

17. The system as defined in claim 15 wherein at least one of the shafts is attached to the coupling portion by a knurled surface.

18. The system as defined in claim 12 further comprising:
    a stepper motor shaft to carry the rotary output of the stepper motor,
    a valve shaft which when rotated, causes the valve to open and close.

19. The system as defined in claim 18 wherein at least one of the coupling portions further comprises:
    an aperture which is closely contoured to a contour of one of the shafts.

20. The system as defined in claim 19 wherein the coupling portion further comprises:
    a slot means, compression of which more securely attaches the aperture to the shaft.

21. The system as defined in claim 20 wherein the coupling portion further comprises:

tightening fastener means, tightening of which compresses the slot.

22. The system as defined in claim 21 wherein the coupling portion further comprises:

shoulder means to prevent full compression of the slot means upon tightening of the tightening fastener means.

23. The system as defined in claim 12 wherein the sensor actuator may pass from a first side of the limit sensor means, through the limit sensor means, to a second opposite side of the limit sensor means.

24. Apparatus for providing position feedback for a rotary inlet valve comprising:

a stepper motor means for supplying rotary power to open and close the rotary valve;

a coupling means, comprising a male coupling portion and a female coupling portion, which transmits stepper motor power to the rotary valve;

a sensor actuator which is affixed to the coupling means;

limit sensor means for actuation by the sensor actuator;

a motor shaft means for transmitting rotary output of the stepper motor; and a valve shaft means, connected to the motor shaft means and rotatable for opening and closing of the rotary valve.

25. A system to determine a position of a rotary valve comprising:

a stepper motor means for supplying power to open and close the rotary valve;

a coupling means for transmitting stepper motor power to the rotary valve;

a sensor actuator affixed to the coupling means;

at least one limit sensor means for determining the position of the rotary valve by sensing the position of the sensor actuator; and a positioning support means, consisting of a printer circuit board, for positioning the sensor in position with respect to the coupling means.

26. A system to determine a position of a rotary valve comprising:

a stepper motor means for supplying power to open and close the rotary valve;

a coupling means for transmitting stepper motor power to the rotary valve;

a sensor actuator affixed to the coupling means;

at least one limit sensor means for determining the position of the rotary valve by sensing the position of the sensor actuator; and a controller means for controlling the position of the rotary valve, wherein the controller is affected by at least one pressure sensor which determines at least one valve pressure.

* * * * *